A. M. TODD.
AUTOMATIC AUTOMOBILE HEADLIGHT DIRECTOR.
APPLICATION FILED MAY 10, 1915.
1,181,809.
Patented May 2, 1916.
2 SHEETS—SHEET 1.
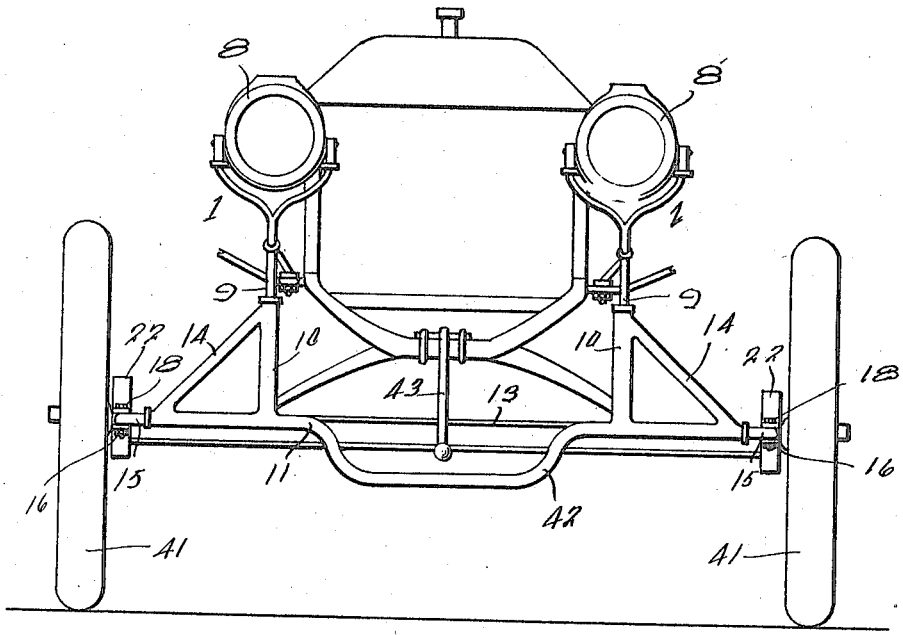
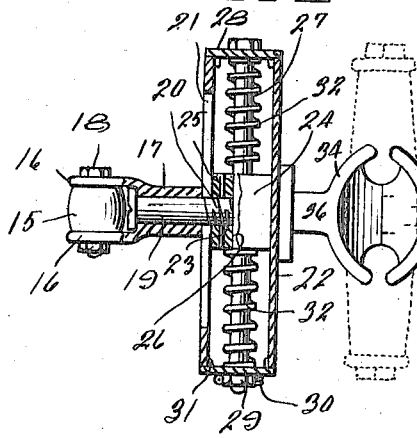
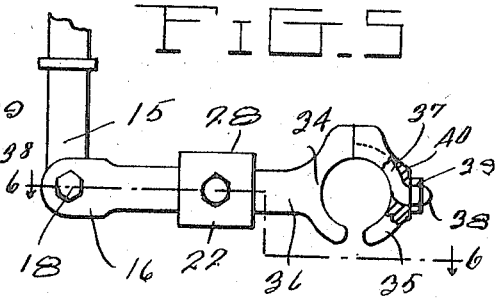
Witnesses
Chas. H. Trotter.
H. T. Riley.
Inventor
A. M. Todd
By [signature]
Attorney

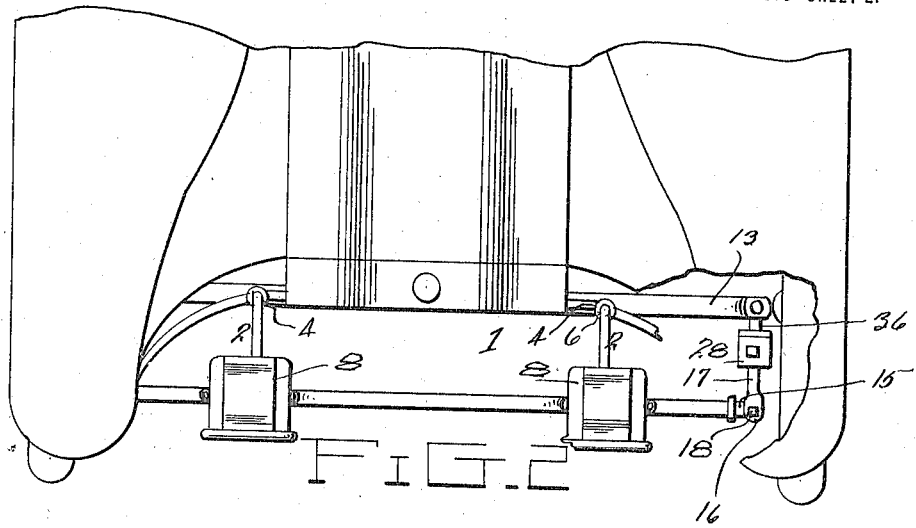
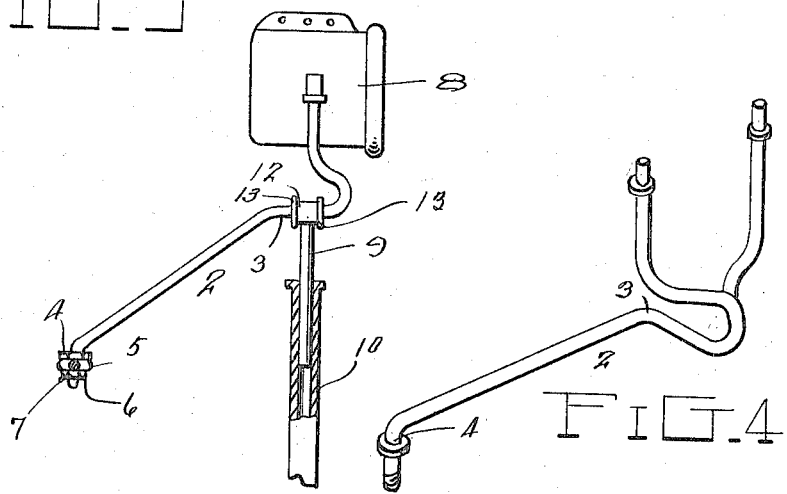
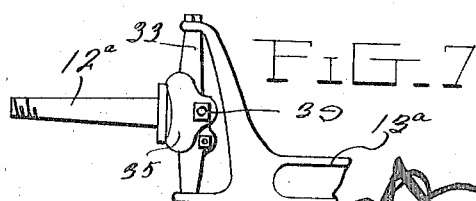

UNITED STATES PATENT OFFICE.

ALVA M. TODD, OF PLACERVILLE, CALIFORNIA.

AUTOMATIC AUTOMOBILE-HEADLIGHT DIRECTOR.

1,181,809.

Specification of Letters Patent.    Patented May 2, 1916.

Application filed May 10, 1915. Serial No. 27,123.

*To all whom it may concern:*

Be it known that I, ALVA M. TODD, a citizen of the United States, residing at Placerville, in the county of El Dorado and State of California, have invented certain new and useful Improvements in Automatic Automobile-Headlight Directors; and I do hereby declare the following to be a full, clear, and exact description of the invention, such as will enable others skilled in the art to which it appertains to make and use the same.

The invention relates to an automobile dirigible headlight for automobiles.

The object of the present invention is to improve the construction of automatic dirigible headlights for automobiles and to provide a simple, inexpensive and efficient automatic headlight of this character of strong and durable construction adapted to be applied to various makes and styles of automobiles and other motor vehicles and capable of responding instantly and accurately to the action of the steering wheel and equipped with means for absorbing the vibration of the body of the vehicle whereby the light is held steadier than is possible without such shock absorbing means.

A further object of the invention is to provide an automatic headlight for automobiles adapted to throw the light in the path of the front wheels of the machine whatever their directions may be and capable of enabling serious accidents to be avoided and making speed less dangerous at night and at the same time indicating to machines in the rear the direction in which the driver or chauffeur intends to take.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings Figure 1 is a front elevation of an automobile provided with an automatic dirigible headlight constructed in accordance with this invention, Fig. 2 is a plan view of the same, Fig. 3 is a side elevation partly in section illustrating the manner of mounting the lamps, Fig. 4 is a detail perspective view of one of the lamp brackets, Fig. 5 is a plan view of one of the connections between the device and the pivoted section or spindle of the front axle, Fig. 6 is a sectional view on the line 6—6 of Fig. 5, Fig. 7 is a detail view illustrating the manner of mounting the clamps on the pivoted section or spindle of the front axle.

Like numerals of reference designate corresponding parts in all the figures of the drawings.

In the accompanying drawings in which is illustrated the preferred embodiment of the invention 1—1 designate lamp brackets provided with arms 2 having horizontal front portions 3 and extending downwardly and rearwardly or inwardly at an inclination and provided at their inner or rear ends with vertical pivots 4 which are detachably secured in sockets 5 of an automobile at the front thereof at opposite sides of the radiator as clearly illustrated in Fig. 1 of the drawings but the lamp brackets may be pivotally mounted on any other part of the machine as will be readily understood.

The lower end of the pivot of each lamp bracket is threaded for the reception of a nut 6 which is secured by a key 7 or other suitable fastening device. The lamp brackets 1 are adapted to support any kind of lamp 8 and they are connected at the front horizontal portions 3 of their arms 2 with vertically slidable rods 9 telescoping in vertical tubes 10 of a transverse connecting rod or member 11. The vertical rod or section 9 of the adjustable telescopic connection between the brackets and the rod or member 11 is provided at its upper end with an eye 12 which is held between collars 13 suitably fixed to the horizontal portion of the arm of the lamp bracket. While the upper ends of the rods 9 are secured to the arms 2 in this manner any other form of pivotal or swivel connection may be employed to permit or facilitate free movement of the rods 9 in the tubes 10 in the operation of the device through the steering mechanism of the automobile. The slidable or telescopic connection between the transverse connecting rod or member 11 and the lamp brackets permit a relative vertical movement of the parts in order that the springs of the automobile or other motor vehicle may absorb the shocks and jars without the same being transmitted to the lamps through the connections between the latter and the pivoted section or spindles 12ᵃ of the front axle 13ᵃ of the automobile.

The vertical tubes 10 are preferably formed integral with the transverse connecting rod or member 11 which is also designed to be constructed of tubular metal and the said vertical tubes are supported by outer inclined braces 14 extending upwardly and inwardly from the outer portions of the transverse connecting rod or member 11 to the upper ends of the vertical tubes and formed integral with the said parts. The connecting rod or member 11 is provided at its ends with solid portions 15 which are pivoted between upper and lower ears 16 of coupling sleeves 17 by vertical bolts 18 or other suitable pivots. These sleeves or couplings 17 receive horizontal bolts 19 extending longitudinally of the sleeves and having heads arranged between the ears 16 and also provided with threaded portions 20 extending through vertical slots 21 of vertical sleeves 22 and secured in threaded sockets 23 of slides 24 by pins 25 or other suitable fastening means. The sleeves 22 which are rectangular in cross section form guides for the slides which are arranged within and conform to the configuration of the vertical sleeves 22 and the said slides 24 are also provided with vertical openings 26 through which pass vertical bolts 27. The vertical bolts 27 which extend through the guiding sleeves 22 secure upper and lower cap plates 28 to the same and are provided at their lower ends with nuts 29 which are retained on the threaded portions of the vertical bolts by keys 30 or other suitable fastening devices.

The cap plates are held against lateral movement by projections 31 extending from the inner face of the said plate and engaging the inner faces of the walls of the vertical sleeves as clearly illustrated in Fig. 6 of the drawings. The slots 21 are formed in the front walls of the sleeves and the vertically movable slides 24 are cushioned by upper and lower coiled springs 32 disposed on the vertical bolt and interposed between the slides 24 and the cap plates. These springs are adapted to absorb the jar and vibration incident to the wheels of the front axle traveling over rough surfaces and dropping into ruts or riding over stones and other obstructions. The vertical sleeves are secured to the pivots 33 of the spindles 12 of the front axle by clamps composed of relatively fixed and adjustable sections 34 and 35. The section 34 is provided with a horizontal shank 36 which is rigid with and suitably secured to the vertical sleeve 22 at the rear wall thereof. This section 34 of the clamp is also provided with a rearwardly extending stem 37 having a threaded portion 38 for the reception of a nut 39 and extending through an opening 40 in the relatively adjustable section 35. The sections 34 and 35 are curved both vertically and horizontally or transversely to conform to the configuration of the vertical pivot portion of the spindle of the front axle and the said vertical pivot is clamped at the inner end of the spindle by the sections 34 and 35 whereby the vertical sleeve is securely mounted on the pivoted section or spindle and is adapted to respond to the movements thereof under the action of the steering gear of the automobile or other motor vehicles. The connection between the ends of the transverse connecting bar or member 11 and the pivots of the spindle of the front axle correspond in length to the effective portion of the arms of the lamp brackets, the distance between the front and rear pivots of the said parts being uniform and the arms and the connections at the ends of the transverse bar or member 11 being in parallelism so that the lamp brackets will move laterally with the front wheels 41 without binding. By this construction the light from the lamps 8 will always be thrown in the direction in which the front wheels are turned and they will respond simultaneously with the front wheels to the action of the steering gear. The transverse connecting rod or member 11 is provided at the center with a drop bend 42 which is adapted to provide ample space for the cranking of the machine. The bend 42 clears the crank 43 and does not in any way interfere with the movement of the latter.

It will be seen that the lamp brackets are carried by the spring supported chassis of the automobile and that the connecting rod or member 11 is yieldably connected at its ends with the front axle by the upper and lower cushioning springs 32 and that the said transverse rod or member is also slidably connected with the lamp brackets so that the jars and vibrations will be absorbed and not communicated to the lamps which will be maintained in a steady position without being affected by the jars and jolts incident to the wheels traveling over a rough roadway.

The cushion slides 24 operating in the guide sleeves 22 are adapted to take up the alternate jolts caused by either the front wheels passing over obstructions or dropping into ruts and the pivots formed by the bolts 19 and the sleeves 17 are designed as safeguards against any strain due to any lack of parallelism of the guide sleeves 22 and the vertical tubes 10 resulting from such jolting and cushioning action. The cushioning springs tend to maintain the slides in a central position.

What is claimed is:

1. An automobile headlight of the class described comprising spaced lamp brackets provided with rearwardly extending arms pivoted at their rear ends and arranged to swing laterally to move the lamp bracket bodily through a horizontal arc, said arms being provided at their front portions with depending vertical pivots, a transverse rod or member provided with vertical tubular portions forming bearings and receiving said pivots and means for connecting the ends of the transverse rod or member with the pivoted sections or spindles of the front axle of an automobile.

2. An automobile headlight of the class described comprising spaced lamp brackets provided with rearwardly extending arms pivoted at their rear ends and arranged to swing laterally to move the lamp bracket bodily through a horizontal arc, said arms being provided at their front portions with depending vertical pivots, a transverse rod or member provided with vertical tubular portions forming bearings and receiving said pivots and means for connecting the ends of the transverse rod or member with the pivoted sections or spindles of the front axle of an automobile, said means including vertically slidable members and cushioning means.

3. An automobile headlight of the class described including a pivotally mounted lamp bracket, a transverse rod or member connected with the lamp bracket and means for connecting the ends of the rod or member with the pivoted sections or spindles of the front axle for transmitting the motion of the same to the lamp bracket, said means including a vertical guide connected with the pivoted spindle or section, a slide operating in the guide and connected with the rod or member and means for cushioning the slide.

4. An automobile headlight of the class described including a pivotally mounted lamp bracket, a transverse rod or member connected with the lamp bracket, means for connecting the ends of the rod or member with the pivoted sections or spindles of the front axle for transmitting the motion of the same to the lamp bracket, said means including a vertical guide connected with the pivoted spindle or section, a slide operating in the guide and connected with the rod or member and upper and lower springs arranged to cushion the slide.

5. An automobile headlight of the class described including a pivotally mounted horizontally swinging lamp bracket, a transverse rod or member connected with the lamp bracket and means for connecting the transverse rod or member with the pivoted sections or spindles of the front axle, said means including a vertical sleeve forming a guide and connected with the pivoted spindle or section, a slide connected with the rod or member and movable vertically in the sleeve, a vertical rod or bolt mounted in the sleeve and upper and lower cushioning springs mounted on the rod or bolt and arranged to cushion the slide.

6. An automobile headlight of the class described including a pivotally mounted horizontally swinging lamp bracket, a transverse rod or member connected with the lamp bracket and means for connecting the transverse rod or member with the pivoted sections or spindles of the front axle, said means comprising a vertical sleeve having a slot, a slide operating in the sleeve, a tubular coupling pivoted to the rod or member, a fastening device carried by the coupling and extending through the slot of the sleeve and connected with the slide and means for cushioning the slide.

7. An automobile headlight of the class described including a pivotally mounted horizontally swinging lamp bracket, a transverse rod or member connected with the lamp bracket and means for connecting the transverse rod or member with the pivoted sections or spindles of the front axle, said means comprising a vertical sleeve provided with cap plates having projections, said sleeve being connected with one of the front spindles or sections of the front axle, a vertical bolt securing the cap plates to the sleeve, a slide operating in the sleeve and having an opening receiving the vertical bolt, coiled springs disposed on the vertical bolt and arranged above and below the slide to cushion the same, and means for connecting the slide with the rod or member.

8. An automobile headlight of the class described including a pivotally mounted horizontally swinging lamp bracket, a transverse rod or member connected with the lamp bracket and means for connecting the transverse rod or member with the pivoted sections or spindles of the front axle, said means being provided with a clamp comprising a relatively thick section having a stem and an adjustable section mounted on the stem, said section conforming to the configuration of and adapted to clamp the pivoted section of the front axle.

9. An automobile headlight of the class described including a pivotally mounted horizontally swinging lamp bracket, a transverse rod or member connected with the lamp bracket and means for connecting the transverse rod or member with the pivoted sections or spindles of the front axle, said means including a vertical guide, means operating in the guide and connected with the rod or member and a clamp for engaging the pivoted section or spindle of the front axle, said clamp comprising a relatively thick section having a shank connected with the guide, said relatively thick section being also provided with a stem having a threaded portion, a relatively adjustable section mounted on the stem, and a nut engaging the threaded portion of the stem for securing the relatively adjustable section in its adjustment.

In testimony whereof I affix my signature in presence of two witnesses.

ALVA M. TODD.

Witnesses:
 ADOLPH G. ADLER,
 CHARLIE W. HARTWICK.

Copies of this patent may be obtained for five cents each, by addressing the "Commissioner of Patents, Washington, D. C."